United States Patent [19]
Bouet et al.

[11] Patent Number: 5,306,583
[45] Date of Patent: Apr. 26, 1994

[54] HYDRIDABLE MATERIAL FOR THE NEGATIVE ELECTRODE OF A NICKEL-HYDRIDE STORAGE CELL

[75] Inventors: Jacques Bouet, Paris; Bernard Knosp, Neuilly sur Seine; Annick Percheron-Guegan, Paris; Jean-Michel Cocciantelli, Bordeaux, all of France

[73] Assignee: SAFT, Romainville, France

[21] Appl. No.: 990,079

[22] Filed: Dec. 14, 1992

[30] Foreign Application Priority Data

Dec. 4, 1992 [FR] France .................. 92 14662

[51] Int. Cl.$^5$ .................................. H01M 4/24
[52] U.S. Cl. .......................... 429/223; 429/224; 420/455; 420/900
[58] Field of Search ............. 429/223, 224; 420/455, 420/900

[56] References Cited

U.S. PATENT DOCUMENTS

| | | | |
|---|---|---|---|
| 4,396,576 | 8/1983 | Osumi et al. | 420/455 |
| 4,609,599 | 9/1986 | Percheron nee Guegan et al. | 420/455 |
| 5,008,164 | 4/1991 | Furukawa et al. | 429/59 |

FOREIGN PATENT DOCUMENTS 0210372 2/1987 European Pat. Off. .
4011440 10/1991 Fed. Rep. of Germany .
1019062 1/1986 Japan .

OTHER PUBLICATIONS

Patent Abstracts of Japan, vol. 14, No. 402 (P-1099) Aug. 30, 1990 & JP-A-21 54 126 (Chubu Electric Power Co. Inc.) Jun. 13, 1990.
Patent Abstracts of Japan, vol. 13, No. 215 (P-874) May 19, 1989 & JP-A-10 32 132 (Nippon Telegraph & Telephone Corporation) Feb. 2, 1989.
Journal of Nondestructive Evaluation, vol. 8, No. 2, Jun. 1989, New York, US, pp. 135-145, Claus et al.: "Embedded Optical Fibre Sensors for Materials Evaluation".

Primary Examiner—Prince Willis, Jr.
Assistant Examiner—M. Nuzzolillo
Attorney, Agent, or Firm—Sughrue, Mion, Zinn, Macpeak & Seas

[57] ABSTRACT

A hydridable alloy material represented by the formula $AB_5$ for the negative electrode of a nickel-hydride storage cell. A represents $La_{(1-x-y-z)}Ce_xNd_yPr_z$, where $0 \leq x \leq 0.784$, $0 \leq z \leq 1$, $0.1 \leq x+z$, $0 < y+z$, $x+y+z \leq 1$, and
$0 \leq y \leq 0.205 - 1.17x + 2.39x^2 - 1.57x^3 - z(0.23 - 0.65x + 1.18x^2) + z^2(0.18 - 0.54x)$, and B represents Ni partially substituted by Mn, Al and Co.

4 Claims, 3 Drawing Sheets

HYDRIDABLE MATERIAL FOR THE NEGATIVE ELECTRODE OF A NICKEL-HYDRIDE STORAGE CELL

FIELD OF THE INVENTION

The invention relates to a hydridable material for the negative electrode of a nickel-hydride storage cell.

BACKGROUND OF THE INVENTION

In certain applications, nickel-cadmium storage cells are being replaced by nickel-hydride storage cells. Sealed nickel-hydride storage cells are alkaline storage cells having an aqueous electrolyte. The reagent, which is constituted by hydrogen, is stored in the mass of the hydridable alloy which is capable of absorbing large quantities thereof. Depending on whether the storage cell is being charged or discharged, such an alloy must be capable of taking up hydrogen and of restoring it at sufficient speed under normal operating conditions. Its electrochemical capacity must also be higher than that of cadmium, it must withstand corrosion in potassium hydroxide, and it must not be toxic.

Currently, the main alloys used are hydridable alloys of the $AB_5$ type, derived from $LaNi_5$. The compound $LaNi_5$ has a reversible solid-gas hydrogen absorption capacity equivalent to 370 mAh/g. However, its plateau pressure, which is about 2 bars, is too high for it to be used in the negative electrode of a storage cell, for which the plateau pressure must lie in the range 0.01 bars to 1 bar. Furthermore, that alloy has insufficient resistance to corrosion in potassium hydroxide.

To reduce the cost of $LaNi_5$ type alloys, lanthanum is generally replaced by misch metal, designated by Mm, whose composition is typically:

$$La_{0.25 \, to \, 0.35}Ce_{0.45 \, to \, 0.55}Nd_{0.10 \, to \, 0.20}Pr_{0.03 \, to \, 0.07}.$$

By partially substituting nickel with aluminum and manganese, it is possible to lower the plateau pressure, and by partially substituting nickel with cobalt, it is possible to improve the resistance to corrosion of the alloy.

An alloy of the $MmB_5$ type, based on misch metal Mm and satisfying the formula $MmNi_{3.5}Mn_{0.5}Al_{0.3}Co_{0.7}$, is described in Japanese Patent Application JP-61 233 969. A storage cell implementing an electrode whose alloy has the above composition does not have the capacity that might be expected.

SUMMARY OF THE INVENTION

An object of the present invention is to provide a hydridable material having high capacity per unit mass, for use in the negative electrode of a nickel-hydride storage cell.

The present invention provides a hydridable material of the $AB_5$ type for the negative electrode of a nickel-hydride storage cell, the material being derived from the compound $MmNi_5$, Mm being misch metal, where the nickel is partially substituted by manganese, aluminum, and cobalt, said material being characterized by the fact that the general formula for the term A is as follows:

$$La_{(1-x-y-z)}Ce_xNd_yPr_z,$$

where $0 \leq x \leq 0.784$, $0 \leq z \leq 1$, $0.1 \leq x+z$, $0 < y+z$, $x+y+z \leq 1$, and $$0 \leq y \leq 0.205 - 1.17x + 2.39x^2 - 1.57x^3 - z(0.23 - 0.65x + 1.18x^2) + z^2(0.18 - 0.54x).$$

Compared with a natural misch metal Mm, this composition enables the capacity per unit mass of the material to be increased by at least 15 mAh/g.

In a particularly advantageous first variant embodiment, in said general formula: $0 \leq x \leq 0.21$, and $0 \leq y \leq 2(0.21 - x - 0.4z + 0.25z^2)/3$. Compared with prior art, this composition enables the capacity per unit mass of the material to be increased by at least 25 mAh/g.

Preferably, in a second variant embodiment, in said general formula: $0 \leq x \leq 0.12$, $0 \leq y \leq 2(0.12 - x - z/3)/3$, and $0 \leq z \leq 0.36$. Compared with prior art, this composition enables the capacity per unit mass of the material to be increased by at least 40 mAh/g.

In said material, the general formula for the term $B_5$ is as follows:

$$Ni_aMn_bAl_cCo_d,$$

where $3.25 \leq a \leq 3.75$, $0.25 \leq b \leq 0.45$, $0.25 \leq c \leq 0.45$, $0.65 \leq d \leq 0.95$, and $4.8 \leq a+b+c+d \leq 5.2$.

This formula offers the advantage of lowering the plateau pressure of the material, and of improving its resistance to corrosion.

Said hydridable material is particularly intended for use in the negative electrode of a nickel-hydride storage cell, the electrode being made from a mixture composed of said hydridable material in powder form, of 0.1% to 10% of a conductive powder, and of 0.05% to 5% of organic binder, the mixture being fixed on a conductive support. But without going beyond the ambit of the invention, the alloy may also be implemented for the purposes of making an electrode by incorporating said material in a three-dimensional conductive support, e.g. a metal felt or foam, or by fixing it on a two-dimensional support, such as a perforated strip or a grid.

The present invention offers the advantages of providing capacities per unit mass that are at least 15 mAh/g greater and even as much as 40 mAh/g greater than those obtained by using natural misch metal Mm. The presence of neodymium Nd contributes to lowering capacity, and so the use of an alloy of the invention that is poor in neodymium Nd enables higher capacities to be obtained. Furthermore, neodymium is widely used in industry (e.g. for rare earth magnets), and it is advantageous from the point of view of cost to extract neodymium from the natural alloy so as to make use of it independently.

Other characteristics and advantages of the present invention will appear on reading the following description, and the following examples of implementations given by way of non-limiting example, with reference to the accompanying drawings.

BRIEF DESCRIPTION OF THE DRAWINGS

In FIGS. 1 to 3, the content y of neodymium Nd is given up the ordinate, the content x of cerium Ce is given along the abscissa, and the content z of praseodymium Pr is given in the third dimension. In each figure, the composition M of misch metal Mm is recalled.

FIG. 1 shows a composition domain D1 of the material of the invention enabling at least 275 mAh/g to be obtained. In this domain, A is defined by:

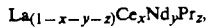
$$La_{(1-x-y-z)}Ce_xNd_yPr_z,$$

where $0 \leq x \leq 0.784$, $0 \leq z \leq 1$, and $0 \leq y \leq 0.205 \leq 1.17x + 2.39x^2 - 1.57x^3 - z(0.23 - 0.65x + 1.18x^2) + z^2(0.18 - 0.54x)$.

Figure 2:
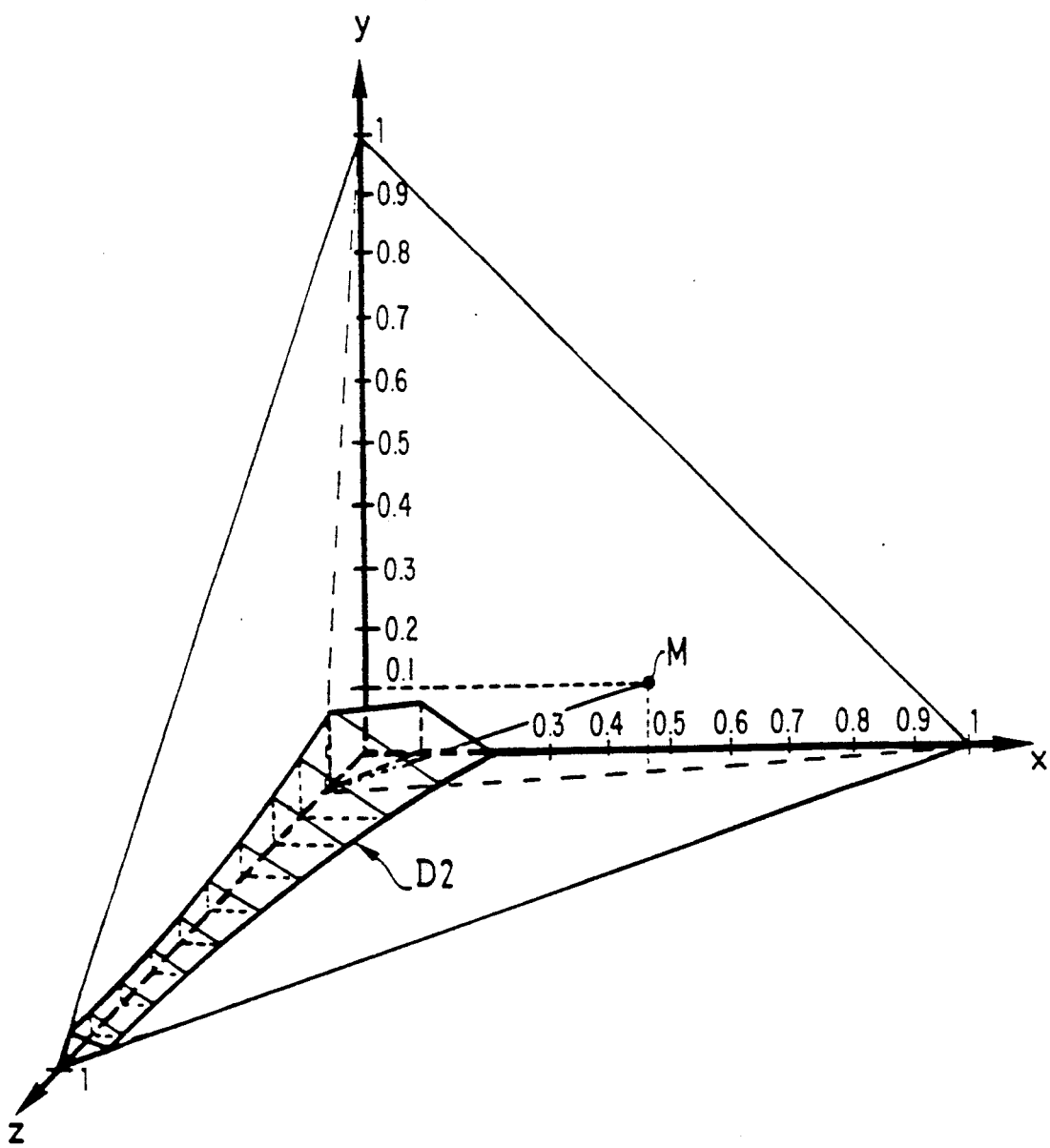
FIG. 2 is analogous to FIG. 1, and it shows a first variant composition offering a gain in capacity that is greater than 25 mAh/g.

FIG. 2 shows a composition domain D2 of the material of the invention enabling capacities of greater than 285 mAh/g to be obtained. In this domain, A is defined by:

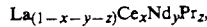
$$La_{(1-x-y-z)}Ce_xNd_yPr_z,$$

where $0 \leq x \leq 0.21$, $0 \leq z \leq 1$, and $0 \leq y \leq 2(0.21 - x - 0.4z + 0.25z^2)/3$.

Figure 3:
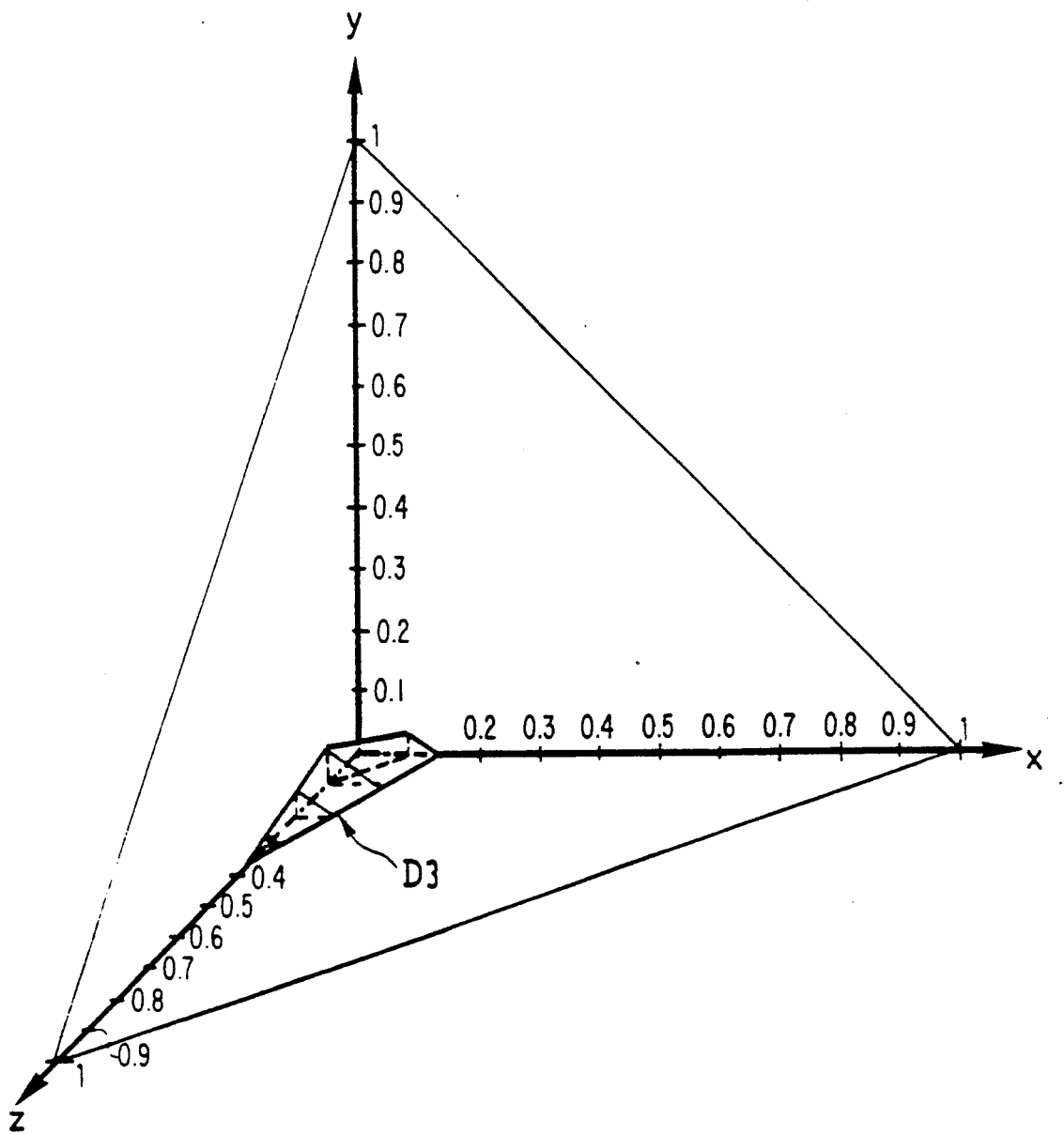
FIG. 3 is analogous to FIG. 1, and it shows a second variant composition offering a gain in capacity that is greater than 40 mAh/g.

FIG. 3 also shows the limits of a domain D3 in which capacity is at least 300 mAh/g. In this domain, A is defined by:

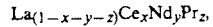
$$La_{(1-x-y-z)}Ce_xNd_yPr_z,$$

where $0 \leq x \leq 0.12$, $0 \leq z \leq 0.36$, and $0 \leq y \leq 2(0.12 - x - z/3)/3$.

EXAMPLE 1

Prior Art

Figure 1:
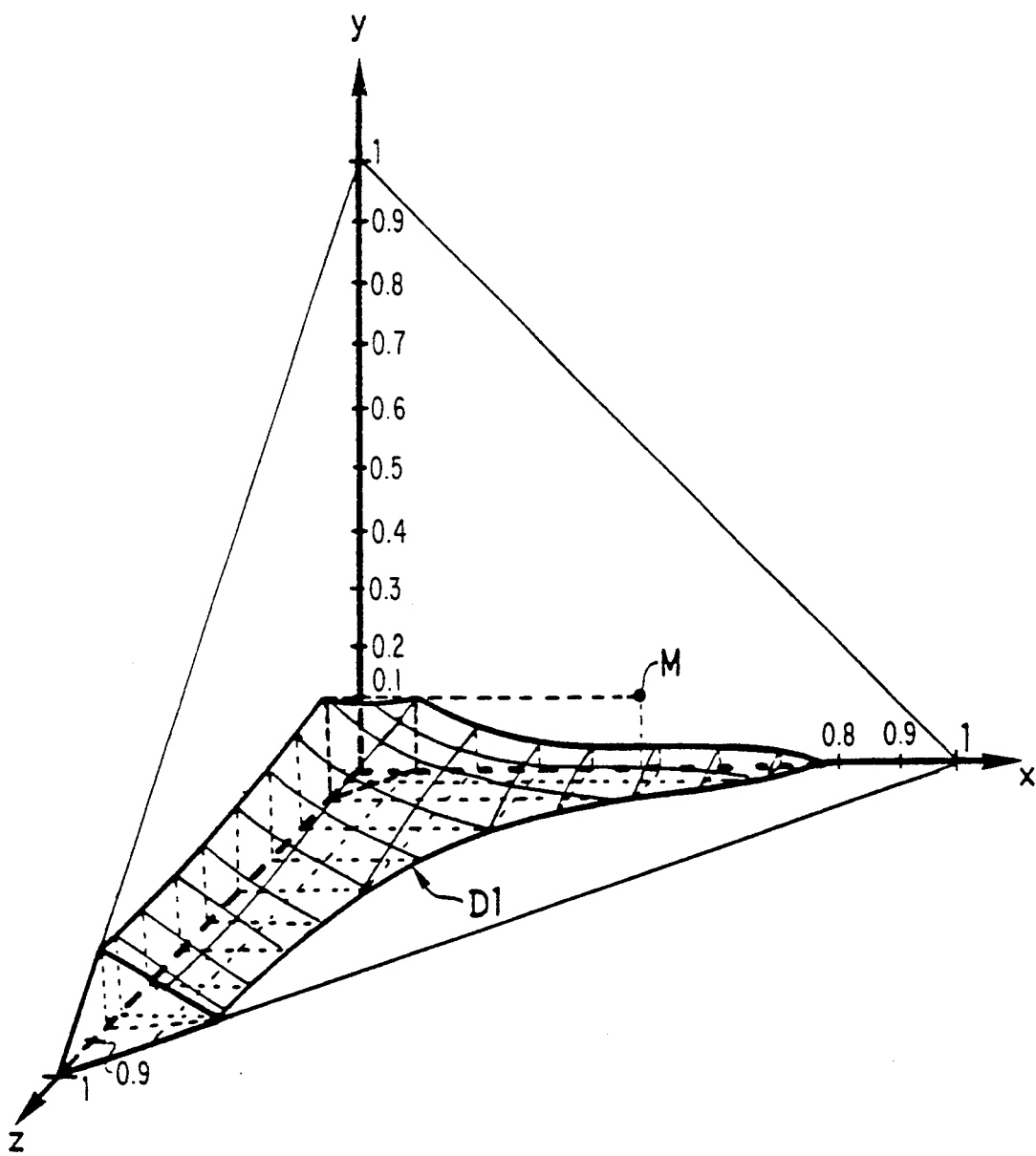
FIG. 1 uses a three-dimensional frame of reference to show the domain of composition of the material of the invention which makes it possible to obtain capacities that are at least 15 mAh/g greater than those of a material based on natural misch metal Mm.

An electrode was made from an $AB_5$ type hydridable material based on natural misch metal Mm. In this case, A was $La_{0.3}Ce_{0.49}Nd_{0.16}Pr_{0.05}$, and $B_5$ was $Ni_{3.55}Mn_{0.30}Al_{0.40}Co_{0.75}$. In FIGS. 1 to 3, the composition of this alloy is represented by the point M.

The alloy was reduced to powder form (particle size: mean diameter = 22 µm) by mechanical grinding in an inert atmosphere (argon), or by solid-gas hydriding cycling. The electrode was composed as follows: 90% of alloy in powder form, 5% of a conductive carbon powder, and 5% of organic binder based on PTFE, supported by a current collector made of expanded nickel.

The negative electrode obtained in this way was mounted in a sealed test cell to face a counter-electrode made of nickel; a non-woven separator was disposed between the two electrodes; and the electrolyte was 8.7N potassium hydroxide KOH. The test protocol was as follows:

charging for 16 hours at C/10 (corresponding to charging the capacity C in 10 hours); and discharging at C/5 until a stop voltage of 0.9 volts is reached, followed by residual discharging at C/10 down to 0.9 volts.

The total capacity restored on the third cycle was 261 mAh/g.

EXAMPLE 2

In the same way as described in example 1, an electrode was made from an $AB_5$ type alloy in powder form (17 µm $\leq$ mean diameter $\leq$ 29 µm), in which A corresponded to the formula $La_{0.30}Ce_{0.03}Nd_{0.02}Pr_{0.65}$, and $B_5$ was identical to example 1. This composition is represented by the domain D1 in FIG. 1.

The electrode was cycled under the same conditions as in example 1. On the third cycle, a capacity per unit mass of 284 mAh/g was obtained, corresponding to a gain of 22 mAh/g.

EXAMPLE 3

In the same way as described in example 1, an electrode was made from an $AB_5$ type alloy in powder form (of grain size as in example 2), in which A corresponded to the formula $La_{0.50}Ce_{0.05}Nd_{0.02}Pr_{0.43}$, and $B_5$ was identical to example 1. This composition is represented by the domain D2 in FIG. 2.

The electrode was cycled under the same conditions as in example 1. On the third cycle, a capacity per unit mass of 289 mAh/g was obtained, corresponding to a gain of 29 mAh/g.

EXAMPLE 4

In the same way as described in example 2, an electrode was made from an $AB_5$ type alloy in powder form, in which A corresponded to the formula $La_{0.82}Ce_{0.03}Nd_{0.02}Pr_{0.13}$, and $B_5$ was identical to example 1. This composition is represented by the domain D3 in FIG. 3.

The electrode was cycled under the same conditions as in example 1. On the third cycle, a capacity per unit mass of 310 mAh/g was obtained, corresponding to a gain of 50 mAh/g.

EXAMPLE 5

In the same way as described in example 2, an electrode was made from an $AB_5$ type alloy in powder form, in which A corresponded to the formula $La_{0.20}Pr_{0.80}$, and $B_5$ was identical to example 1. This composition belongs to the domain D2 shown in FIG. 2.

The electrode was cycled under the same conditions as in example 1. On the third cycle, a capacity per unit mass of 289 mAh/g was obtained, corresponding to a gain of 27 mAh/g.

EXAMPLE 6

In the same way as described in example 2, an electrode was made from an $AB_5$ type alloy in powder form, in which A corresponded to the formula $La_{0.70}Pr_{0.30}$, and $B_5$ was identical to example 1. This composition is represented by the domain D3 in FIG. 3.

The electrode was cycled under the same conditions as in example 1. On the third cycle, a capacity per unit mass of 304 mAh/g was obtained, corresponding to a gain of 43 mAh/g.

EXAMPLE 7

In the same way as described in example 2, an electrode was made from an $AB_5$ type alloy in powder form, in which A was Pr, and $B_5$ was identical to example 2. This composition is represented by the domain D2 in FIG. 2.

The electrode was cycled under the same conditions as in example 1. On the third cycle, a capacity per unit mass of 293 mAh/g was obtained, corresponding to a gain of 32 mAh/g.

Naturally, the present invention is not limited to the above-described embodiments. Without going beyond the ambit of the invention it is possible to vary the contents of the different components of the alloy within the ranges indicated.

We claim:

1. A hydridable alloy material represented by the formula $AB_5$ for the negative electrode of a nickel-hydride storage cell, A represents $La_{(1-x-y-z)}Ce_xNd_yPr_z$, where $0 \leq x \leq 0.784$, $0 \leq z \leq 1$, $0.1 \leq x+z$, $0 < y+z$, $x+y+z \leq 1$, and $0 \leq y \leq 0.205 - 1.17x + 2.39x^2 - 1.57x^3 - z(0.23 - 0.65x + 1.18x^2) + z^2(0.18 - 0.54x)$, and wherein $B_5$ represents $Ni_aMn_bAl_cCo_d$, where $3.25 \leq a \leq 3.75$, $0.25 \leq b \leq 0.45$, $0.25 \leq c \leq 0.45$, $0.65 \leq d \leq 0.95$, and $4.8 \leq a+b+c+d \leq 5.2$.

2. A material according to claim 1 wherein $0 \leq x \leq 0.21$, and $0 \leq y \leq 2(0.21 - x - 0.4z + 0.25z^2)/3$.

3. A material according to claim 1, wherein $0 \leq x \leq 0.12$, $0 \leq y \leq 2(0.12 - x - z/3)/3$, and $0 \leq z \leq 0.36$.

4. A negative electrode for a nickel-hydride storage cell comprising a mixture of a hydridable alloy material in powder form, 0.1% to 10% of a conductive powder, and 0.05% to 5% of organic binder, and said mixture being fixed on a conductive support, the hydridable alloy material is represented by the formula $AB_5$, A represents $La_{(1-x-y-z)}Ce_xNd_yPr_z$, where $0 \leq x \leq 0.784$, $0 \leq z \leq 1$, $0.1 \leq x+z$, $0 < y+z$, $x+y+z \leq 1$, and $0 \leq y \leq 0.205 - 1.17x + 2.39x^2 - 1.57x^3 - z(0.23 - 0.65x + 1.18x^2) + z^2(0.18 - 0.54x)$, and wherein $B_5$ represents $Ni_aMn_bAl_cCO_d$ where $3.25 \leq a \leq 3.75$, $0.25 \leq b \leq 0.45$, $0.25 \leq c \leq 0.45$, $0.65 \leq d \leq 0.95$, and $4.8 \leq a+b+c+d \leq 5.2$.

* * * * *